A. CANDELON.
MECHANISM FOR THE TRANSMISSION OF ROTARY MOVEMENT.
APPLICATION FILED JULY 10, 1915.

1,178,624.

Patented Apr. 11, 1916.

Alexandre Candelon
Inventor by Laurence Langner
Attorney

UNITED STATES PATENT OFFICE.

ALEXANDRE CANDELON, OF ST.-MANDÉ, FRANCE.

MECHANISM FOR THE TRANSMISSION OF ROTARY MOVEMENT.

1,178,624. Specification of Letters Patent. Patented Apr. 11, 1916.

Application filed July 10, 1915. Serial No. 39,209.

*To all whom it may concern:*

Be it known that I, ALEXANDRE CANDELON, citizen of the Republic of France, residing at 40 Rue de la République, St.-Mandé, Seine, in the Republic of France, have invented new and useful Improvements in and Relating to Mechanisms for the Transmission of Rotary Movement, of which the following is a specification.

This invention relates to the conversion of the reciprocating movement of a connecting rod into a rotary movement.

The object of the invention is to provide a mechanism wherein the dead centers of ordinary reciprocating connecting rods are not present, so that the driven member shall always be rotated in one and the same direction independently of the stopping position of the connecting rod and of its direction of movement.

The invention is broadly applicable to the conversion of a reciprocating movement into a continuous rotary movement and more particularly to the driving of sewing machines operated by means of a pedal.

Figure 1:
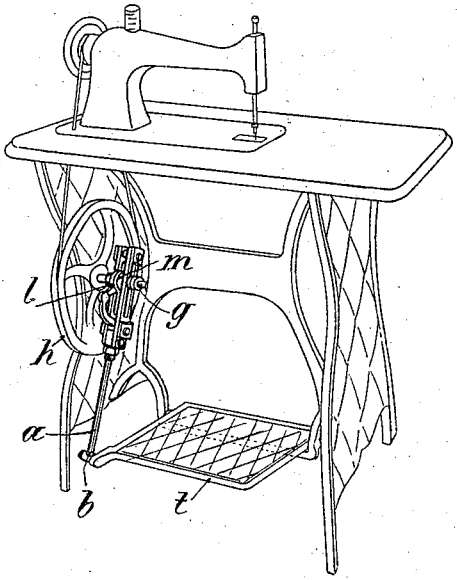
Figure 2:
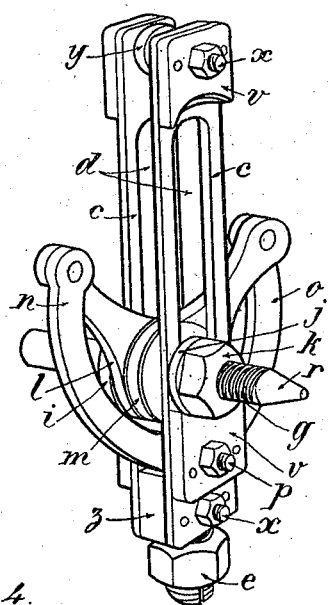
Figure 3:
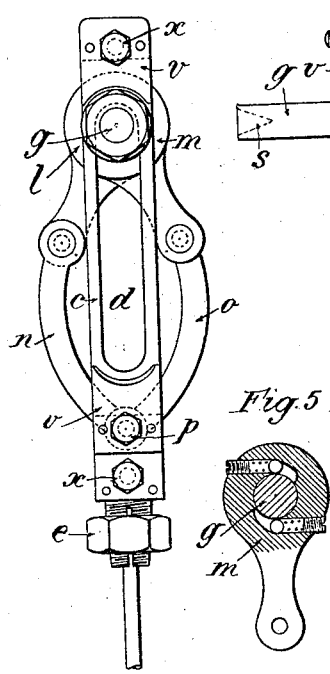
Figures 4, 5:
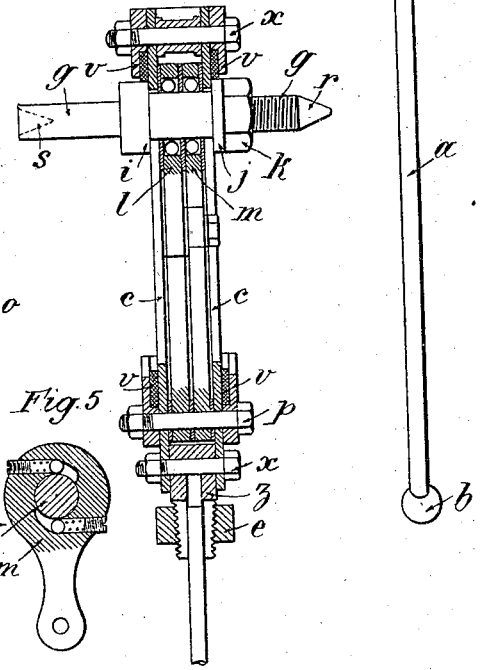

The invention is illustrated by way of example in the accompanying drawings, in which:

Figure 1 is a perspective view of the improved mechanism applied to a sewing machine, the latter being shown in thin lines and the improved mechanism in thick lines; Fig. 2 is a perspective view of the connecting rod, the various members being arranged in the position which they occupy when the connecting rod is at the end of its upward stroke; Fig. 3 is a front elevation showing the various members in the position which they occupy when the connecting rod is at the end of its downward stroke; Fig. 4 is a partly sectional elevation showing more especially the members arranged on the driven shaft. Fig. 5 is a section along a plane parallel to one of the faces of one of the locking mechanisms.

Referring to the drawings, $a$ is a connecting rod terminating at its lower end in a ball $b$. The head of the connecting rod comprises two parallel plates or branches $c$, provided with oblong slots $d$, acting as guides for the members which they are intended to guide. The plates $c$ are connected together by means of bolts $x$, the upper bolt passing through a cross tube $y$, and the lower bolt through a block $z$, which is secured in position by pins. The ball $b$ fits into appropriate bushes secured to the driving member, such as the pedal of the sewing machine, as shown, and may be replaced by an eye permitting of joining the foot of the rod $a$ in the manner of an ordinary connecting rod. The rod $a$ is fixed to its head by means of a conical screw-threaded grip, formed integral with the block $z$ and tightened by means of a nut $e$.

The oblong openings $d$ in the parallel plates $c$ are traversed by a shaft $g$ to which is keyed the driven member of the transmitting mechanism, such as a grooved pulley $h$, toothed wheel or the like. The diameter of the parts of the shaft $g$ lying in the oblong slots $d$ is equal to the width of said slots, so that the shaft $g$ itself serves as a guide for the cross-head of the connecting rod. The shaft $g$ carries at each of the ends of the part on which the cross-head $c$ slides a fixed collar $i$ and a nut $k$ which is suitably screw-threaded, either in a right hand or in a left hand direction, according to the direction in which said shaft $g$ normally rotates.

The shaft $g$ carries between the plates $c$ two locking collars $l$ and $m$, provided with arms joined to small connecting rods $n$ and $o$ respectively, the latter being connected in common around an axle $p$ secured to the base of the cross-head. The locking device of the collars $l$ and $m$ are of the ball type as illustrated in Fig. 5 of the drawing, but may of course be of any other suitable type.

At each of their ends the plates $c$ are provided on their exterior sides with shoes $v$ formed of a material suitable for damping the movement, such as india-rubber, leather or the like, against which the collar $i$ and the flange $j$ of the nut $k$ abut at the end of each stroke of the connecting rod. These shoes permit of braking the movement of the machine by increasing the pressure exerted upon the pedal at the end of one stroke or the other.

When the mechanism hereinbefore described is more particularly applied to a sewing machine actually in use, in which the driving pulley is mounted on a crank-shaft actuated by means of an ordinary connecting rod, the crank-shaft is simply removed and replaced by the shaft $g$ above referred to. For this purpose the shaft $g$ comprises the same means for fixing the position of the pivot as the shaft which it is intended to replace, that is to say, one of its ends terminates in a cone $r$ which engages with a corresponding conical recess in the frame of the machine, its other end being formed with a conical recess $s$ with which engages the conical end of a screw mounted on said frame corresponding to the conical recess referred to.

The mechanism can thus be easily adapted without any modification except that the old crank-shaft is to be replaced by the new one, a substitution that can be made quickly by simply unscrewing and rescrewing the end screw after having previously removed and replaced the grooved pulley upon the new shaft.

The operation of the mechanism described is as follows: When the connecting rod is displaced in one direction by the pedal $t$, for example, upward, the cross-head $c$ slides on each side of the shaft $g$ carrying along with it the axle $p$ of the links $n$, $o$, which impart to the locking collars $l$ and $m$ oscillatory movements in opposite directions around the shaft. The locking mechanisms embodied in the two collars being arranged to act in the same direction and their respective arms in opposite directions, it follows that one of the locking mechanisms acts in such a manner as to cause the shaft to turn while the other locking mechanism remains inoperative. When the connecting rod moves downward the oscillatory movements of the collars take place in the opposite directions, so that the locking mechanism which was previously in action is now inoperative while the other locking mechanism acts upon the shaft, continuing to impart to it a rotary movement in the same direction.

The mechanism hereinbefore described thus permits of obviating the dead centers of ordinary crank-shafts and of rotating the driven shaft always in one and the same direction independently of the stopping position of the connecting rod and of its direction of movement, without it being necessary to impart a movement by hand to the fly-wheel of the machine as is necessary with transmitting mechanisms hitherto in use. The fly-wheel continues to rotate after having received a primary movement from the pedal, and the latter may be stopped in any position without in any way affecting the movement of the fly-wheel which comes to a stop by itself. When it is desired to stop the machine it is sufficient to press upon the pedal, when the connecting rod is either at the top or at the bottom this causing the shoes $v$ to grip the collar $i$ of the shaft $g$ and the flange $j$ of the nut $k$.

It is to be understood that the mechanism has been hereinbefore described only by way of example, and that the forms, dimensions, materials and details of construction and application may be varied without departing from the scope of the invention.

Having now described my invention, what I claim as new and desire to secure by Letters Patent is:

1. A mechanism for the transmission of rotary movement comprising in combination a connecting rod the head of which is slotted so as to let the driven shaft pass therethrough,—two collars mounted on the driven shaft and provided each with an arm,—a locking device arranged in each collar and acting upon the driven shaft in the same direction when the collars are actuated in opposite directions one to each other,—and two links having one of their ends connected respectively to the arms of the collars and their other ends being pivoted on a same point to the connecting rod, substantially as described and for the purpose set forth.

2. A mechanism for the transmission of rotary movement comprising in combination a connecting rod the head of which is slotted so as to let the driven shaft pass therethrough,—two collars mounted on the driven shaft and provided each with an arm,—a ball locking device arranged in each collar and acting upon the driven shaft in the same direction when the collars are actuated in opposite directions one to each other,—and two links having one of their ends connected respectively to the arms of the collars and their other ends being pivoted on a same point to the connecting rod, substantially as described and for the purpose set forth.

3. A mechanism for the transmission of rotary movement comprising in combination a connecting rod the head of which is formed by two parallel plates provided with oblong slots through which passes the driven shaft,—two collars mounted on the driven shaft between the two parallel plates and provided each with an arm,—a locking device arranged in each collar and acting upon the driven shaft in the same direction when the collars are actuated in opposite directions one to each other,—and two links having one of their ends connected respectively to the arms of the collars and their other ends being pivoted on a same point to the connecting rod, substantially as described and for the purpose set forth.

4. A mechanism for the transmission of rotary movement comprising in combination a connecting rod the head of which is formed by two parallel plates provided with oblong slots through which passes the driven shaft,—shoes formed of a material suitable for damping arranged at the ends of the oblong slots formed in the parallel plates,—two collars mounted on the driven shaft between the two parallel plates and provided each with an arm,—a locking device arranged in each collar and acting upon the driven shaft in the same direction when the collars are actuated in opposite directions one to each other,—and two links having one of their ends connected respectively to the arms of the collars and their other ends being pivoted on a same point to the connecting rod, substantially as described and for the purpose set forth.

In testimony whereof I have signed my name to this specification in the presence of two subscribing witnesses.

ALEXANDRE CANDELON.

Witnesses:
ANTOINE LAVORA,
CHAS. P. PRESSLEY.

Copies of this patent may be obtained for five cents each, by addressing the "Commissioner of Patents, Washington, D. C."